United States Patent
Lafitte et al.

(10) Patent No.: US 12,486,445 B2
(45) Date of Patent: Dec. 2, 2025

(54) LIGHTWEIGHT COMPOSITE CEMENT COMPOSITIONS AND METHODS OF CEMENTING WELLS WITH SAID COMPOSITIONS

(71) Applicant: Schlumberger Technology Corporation, Sugar Land, TX (US)

(72) Inventors: Valerie Gisele Helene Lafitte, Sugar Land, TX (US); Dean Michael Willberg, Houston, TX (US); Anatoly Medvedev, Cambridge (GB)

(73) Assignee: Schlumberger Technology Corporation, Sugar land, TX (US)

( * ) Notice: Subject to any disclaimer, the term of this patent is extended or adjusted under 35 U.S.C. 154(b) by 0 days.

(21) Appl. No.: 18/726,493

(22) PCT Filed: May 22, 2023

(86) PCT No.: PCT/US2023/023080
§ 371 (c)(1),
(2) Date: Jul. 3, 2024

(87) PCT Pub. No.: WO2023/225394
PCT Pub. Date: Nov. 23, 2023

(65) Prior Publication Data
US 2025/0075115 A1    Mar. 6, 2025

Related U.S. Application Data

(60) Provisional application No. 63/365,097, filed on May 20, 2022.

(51) Int. Cl.
| | | |
|---|---|---|
| E21B 33/138 | (2006.01) |
| C04B 14/06 | (2006.01) |
| C04B 14/28 | (2006.01) |
| C04B 16/04 | (2006.01) |
| C04B 18/22 | (2006.01) |
| C04B 28/08 | (2006.01) |
| C09K 8/467 | (2006.01) |
| C04B 111/00 | (2006.01) |
| C04B 111/40 | (2006.01) |

(52) U.S. Cl.
CPC .............. C09K 8/467 (2013.01); C04B 14/06 (2013.01); C04B 14/28 (2013.01); C04B 16/04 (2013.01); C04B 18/22 (2013.01); C04B 28/08 (2013.01); E21B 33/138 (2013.01); C04B 2111/00146 (2013.01); C04B 2111/40 (2013.01); C09K 2208/10 (2013.01)

(58) Field of Classification Search
CPC .... C09K 8/467; C09K 2208/10; C04B 14/06; C04B 16/28; C04B 18/22; C04B 28/08; C04B 2111/00146; C04B 2111/40; E21B 33/138
See application file for complete search history.

(56) References Cited

U.S. PATENT DOCUMENTS

| | | | |
|---|---|---|---|
| 4,590,227 A | 5/1986 | Nakamura | |
| 5,123,487 A * | 6/1992 | Harris | E21B 29/10 166/292 |
| 5,580,378 A * | 12/1996 | Shulman | C04B 18/08 106/676 |
| 5,736,594 A | 4/1998 | Boles | |
| 6,907,929 B2 | 6/2005 | Leroy-Delage | |
| 7,138,446 B2 | 11/2006 | Reddy | |
| 7,402,204 B2 | 7/2008 | Le Roy-Delage | |
| 7,612,817 B2 | 11/2009 | Tay | |
| 7,645,817 B2 | 1/2010 | Reddy | |
| 7,717,180 B2 | 5/2010 | Badalamenti | |
| 8,486,868 B2 | 7/2013 | Brenneis | |
| 8,551,244 B2 | 10/2013 | Le Roy-Delage et al. | |

(Continued)

FOREIGN PATENT DOCUMENTS

| | | |
|---|---|---|
| CN | 108026338 A | 5/2018 |
| JP | 2006118130 A | 5/2006 |
| WO | 2005040550 A1 | 5/2005 |
| WO | 2017087163 A1 | 5/2017 |
| WO | 2022122848 A1 | 6/2022 |
| WO | 2025059478 | 3/2025 |

OTHER PUBLICATIONS

Search Report and Written Opinion of International Patent Application No. PCT/US2023/022723 dated Sep. 8, 2023, 9 pages.
Search Report and Written Opinion of International Patent Application No. PCT/US2023/023080 dated Sep. 8, 2023, 8 pages.
Search Report and Written Opinion of International Patent Application No. PCT/US2023/036121 dated Feb. 23, 2024, 9 pages.
Office Action issued in U.S. Appl. No. 18/073,650 dated Feb. 26, 2024, 10 pages.

*Primary Examiner* — Silvana C Runyan
(74) *Attorney, Agent, or Firm* — Jeffrey D. Frantz

(57) ABSTRACT

Composite cement compositions and pumpable slurries for cementing well or at least one zone of the wells are provided and comprise cementitious material that forms calcium silicate hydrates upon exposure to water, inert filler material, nano-sized calcium carbonate particles, and water, wherein the cementitious material has a mean particle size of at least about 0.5 micron and no more than about 20 microns, the inert filler material has particle sizes of at least about 25 microns and no more than about 2 millimeters (mm), and the compositions and slurries have densities of at least about 9.5 pounds per gallon (ppg) and no more than about 12.5 ppg and solid volume fractions of at least about 50%. Methods of cementing the wells or the at least one zone of the wells are also provided and comprise pumping the compositions and slurries into the well and allowing the compositions and slurries to set or cure to form or produce lightweight composite cements having compressive strengths of greater than 400 pounds per square inch.

18 Claims, 1 Drawing Sheet

(56) References Cited

U.S. PATENT DOCUMENTS

| | | |
|---|---|---|
| 9,222,011 B2 | 12/2015 | Le Roy-Delage et al. |
| 9,683,161 B2 | 6/2017 | Le Roy-Delage et al. |
| 9,738,563 B1* | 8/2017 | Bao .................. C04B 41/63 |
| 10,557,341 B2 | 2/2020 | Kolchanov |
| 11,267,760 B2 | 3/2022 | Lehmann |
| 2002/0017224 A1 | 2/2002 | Horton |
| 2005/0058817 A1 | 3/2005 | Famy |
| 2006/0054319 A1 | 3/2006 | Fyten |
| 2006/0174802 A1 | 8/2006 | Bedel et al. |
| 2006/0258546 A1 | 11/2006 | Brannon |
| 2008/0108524 A1 | 5/2008 | Willberg |
| 2009/0236097 A1* | 9/2009 | Roddy .................. E21B 33/14 166/292 |
| 2011/0048709 A1* | 3/2011 | Patil .................. C09K 8/46 166/293 |
| 2012/0024196 A1 | 2/2012 | Gong |
| 2012/0152153 A1 | 6/2012 | Gong |
| 2012/0175134 A1 | 7/2012 | Robisson |
| 2014/0076549 A1* | 3/2014 | Pelletier ................ E21B 47/005 166/250.14 |
| 2016/0032169 A1 | 2/2016 | Chew et al. |
| 2016/0244655 A1 | 8/2016 | Reddy |
| 2016/0289531 A1 | 10/2016 | Agapiou |
| 2017/0015824 A1 | 1/2017 | Gozalo |
| 2017/0334779 A1* | 11/2017 | Gong .................. C09K 8/42 |
| 2018/0100095 A1 | 4/2018 | Reddy |
| 2018/0148628 A1 | 5/2018 | Vlasopoulos |
| 2018/0230358 A1 | 8/2018 | Jain |
| 2018/0244572 A1 | 8/2018 | Ranjbar |
| 2020/0010363 A1 | 1/2020 | Thomas |
| 2020/0247717 A1 | 8/2020 | Atakan |
| 2022/0340488 A1 | 10/2022 | Bullerjahn |
| 2023/0126439 A1 | 4/2023 | Pisklak |
| 2023/0138857 A1 | 5/2023 | Singh |
| 2023/0374366 A1 | 11/2023 | Lafitte |

* cited by examiner

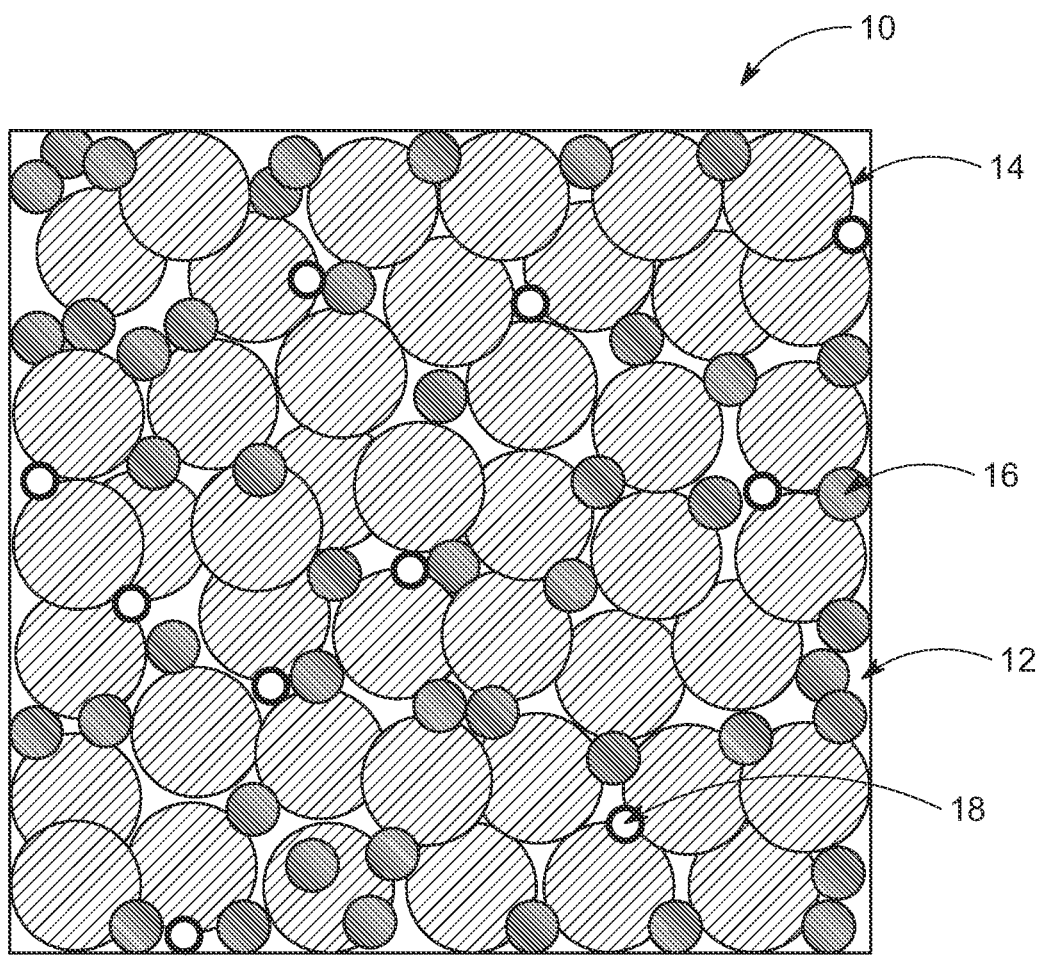

LIGHTWEIGHT COMPOSITE CEMENT COMPOSITIONS AND METHODS OF CEMENTING WELLS WITH SAID COMPOSITIONS

CROSS REFERENCE PARAGRAPH

This application is a National Stage Entry of PCT/US2023/023080, filed May 22, 2023, which claims the benefit of U.S. Provisional Application No. 63/365,097, entitled "LIGHTWEIGHT COMPOSITE CEMENT COMPOSITIONS AND METHODS OF CEMENTING WELLS WITH SAID COMPOSITIONS," filed May 20, 2022, the disclosure of which is hereby incorporated herein by reference.

FIELD OF THE DISCLOSURE

The present disclosure relates to lightweight composite cement compositions or slurries and methods of cementing wells with the lightweight composite cement compositions or slurries. The lightweight composite cement compositions or slurries may have low densities ranging from about 10 to about 12 pounds per gallon and the wells may be oil wells, gas wells, geothermal wells, steam-injection wells, or the like. Additionally, the lightweight composite cement compositions or slurries may have solid volume fractions of greater than 50% and may comprise water, inert filler material, cementitious material, nano-sized calcium carbonate additives, optional cement additives, or at least one combination thereof. The lightweight composite cement compositions or slurries and methods disclosed herein are suitable for cementing the wells and/or cementing or treating one or more zones of the wells.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one or more embodiments, a pumpable composite cement slurry may comprise cementitious material that forms calcium silicate hydrates upon exposure to water, inert filler material, nano-sized calcium carbonate particles, and water, wherein the cementitious material has a mean particle size of at least about 0.5 micron and no more than about 20 microns, the inert filler material has particle sizes of at least about 25 microns and no more than about 2 millimeters (mm), and the slurry has a density of at least about 9.5 pounds per gallon (ppg) and no more than about 12.5 ppg.

In an embodiment, the density of the slurry may be greater than about 10.5 ppg and no more than 12 ppg.

In an embodiment, a solid volume fraction of the slurry may be greater than about 50%.

In an embodiment, the mean particle size of the cementitious material may be at least about 1 micron and no more than about 10 microns.

In an embodiment, the cementitious material may comprise at least one of Portland cement, blast furnace slag, fly ash, or a combination thereof.

In an embodiment, the slurry may further comprise silica material present at a concentration not less than 5% by weight, calculated to a total weight of the slurry.

In an embodiment, particles sizes of the inert filler material may be at least about 50 microns and no more than about 1 mm.

In an embodiment, the inert filler material may have a specific gravity between about 0.8 g/cc to about 1.5 g/cc.

In an embodiment, the inert filler material may comprise at least one of one or more rigid inert filler particles, one or more flexible inert filler particles, or a combination thereof.

In an embodiment, the one or more rigid inert filler particles may comprise plastic-based or polymer-based particles or beads and the one or more flexible inert filler particles comprise flexible elastomeric particles.

In an embodiment, the inert filler material may be at least one selected from at least one elastomeric-based material, a material based on grounded rubber, polystyrene or polystyrene copolymer, a recycled plastic material, grounded nut shells or grounded corn cob, and a combination thereof.

In an embodiment, the inert filler material may be selected from a material based on grounded rubber, polystyrene or polystyrene copolymer, or a combination thereof.

In an embodiment, particles sizes of the nano-sized calcium carbonate particles may be at least about 10 nm and no more than about 100 nm.

In an embodiment, the nano-sized calcium carbonate particles may be present in the slurry at a concentration of at least about 0.1% by weight to about 2% by weight, calculated to a total weight of the slurry.

In an embodiment, the inert filler material may be present in the slurry at a concentration of at least about 30% by weight, calculated to a total weight of the slurry.

In an embodiment, the cementitious material may be present in the slurry at a concentration of at least about 12% by weight, calculated to the total weight of the slurry.

In one or more embodiments, a method of cementing a subterranean well is provided, where the method may comprise pumping the slurry of claim 1 into at least one zone of the well.

In an embodiment, the method may further comprise setting or curing the slurry at a temperature of at least about 100° F. to form a lightweight composite cement that has a compressive strength of greater than about 400 pounds per square inch.

In one or more embodiments, a method of producing composite cement compositions is provided, wherein the method may comprise mixing solid particles with water to form a pumpable cement slurry and setting or curing the slurry at a temperature of at least about 100° F. to produce a lightweight composite cement, wherein the pumpable cement slurry has a density of at least about 10 pounds per gallon (ppg) and no more than about 12 ppg, the lightweight composite cement has a compressive strength of greater than 400 pounds per square inch, and the solid particles comprise: cement particles that form calcium silicate hydrates upon exposure to water and have a mean particle size of at least about 1 micron and no more about 10 microns; inert filler particles having particles sizes of at least about 50 microns and no more than about 1 millimeter; and nano-sized calcium carbonate particles.

In an embodiment, a solid volume fraction of the slurry may be at least about 50%.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

FIG. 1. is an illustration of a lightweight composite cement composition or slurry, according to one or more examples of the disclosure.

DETAILED DESCRIPTION

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

Where a numerical limit or range is stated, the endpoints are or may be included. Also, all values and subranges within a numerical limit or range are specifically included as if explicitly written out.

As used herein, the phrases "selected from the group consisting of," "chosen from," and the like include mixtures of the specified materials. Tunis such as "contains", and the like are meant to include "including at least" unless otherwise specifically noted.

As shown in FIG. 1., at least one lightweight composite cement formulation, composition, and/or slurry 10 (collectively referred to hereinafter as "the lightweight slurries 10" or "the lightweight slurry 10") is disclosed herein and is suitable and usable for cementing at least one borehole, wellbore, and/or well (collectively referred to hereinafter as "the well") disposed, drilled and/or formed within at least one subterranean formation. In some embodiments, the well is at least one oil well, at least one gas well, at least one geothermal well, at least one steam-injection well, or one or more similar subterranean wells. The lightweight slurries 10 disclosed herein may be pumpable cement slurries such that the lightweight slurries 10 may be deployed and/or introduced into the well by known slurry pumping techniques or methods.

In one or more embodiments, the lightweight slurries 10 disclosed herein may have a density of at least 9.5 pounds per gallon (hereinafter "ppg") but no more than about 12.5 ppg or at least 10 ppg but no more than 12 ppg. In some embodiments, the density of the lightweight slurries 10 may be about 10 ppg, greater than about 10.5 ppg, greater than about 11 ppg, about 11.2 ppg, less than about 11.5 ppg, or about 12 ppg. In an embodiment, the lightweight slurries 10 may have densities that are greater than about 1.20 kg/m$^3$ or greater than about 10.5 ppg. Additionally, the lightweight slurries 10 disclosed herein may attain, achieve, or exhibit compression strengths greater than about 400 pounds per square inch (hereinafter "psi") after the lightweight slurries may have set or cured for about 24 hours. In some embodiments, the compression strengths attained, achieved, or exhibited by the lightweight slurries 10 (after being set or cured for about 24 hours at temperatures greater than about 100° F. or about 110° F.) may be greater than about 500 psi, greater than about 600 psi, greater than about 900 psi, or equal to at least about 1000 psi. In an embodiment, the compression strength of the lightweight slurry 10 disclosed herein is greater than about 380 psi, about 410 psi, about 625 psi, about 1000 psi, or less than about 1020 psi.

The lightweight slurries 10 disclosed herein may contain or include at least solid material or solid particles (collectively referred to hereinafter as "the solid particles") and water 12, as shown in FIG. 1. Additionally, the solid particles may comprise inert lightweight filler material or one or more lightweight filler particles 14 (collectively referred to hereinafter as "the filler particles 14") cementitious material or one or more cement particles 16 (collectively referred to hereinafter as "the cement particles 16"), one or more nano-sized calcium carbonate particles 18 (hereinafter "the nano-particles 18"), one or more optional cement additives (hereinafter "the optional additives"), or at least one combination thereof. Further, solid volume fractions for the lightweight slurries 10 may be greater than about 50% or, in other words, the solid particles may occupy more than about 50% of the total volumes of the slurries 10. In some embodiments, the solid volume fraction for the lightweight slurry 10 may be less than about 65%, about 60%, less than about 55%, greater than about 51%, greater than about 52%, or about 53%.

In one more embodiments, the methods disclosed herein may utilize the lightweight slurry 10 disclosed herein for cementing and/or treating the well or at least a portion of the well. When completing the well, metal casing is installed inside the well after the well has been drilled, and space between an outside of the metal casing and a borehole wall of the well is filled, or at least partially filled, with the lightweight slurry 10 disclosed herein to provide physical stability and isolation of one or more fluid-containing zones (hereinafter "the one or more zones") through which the well may pass. The lightweight slurries 10 disclosed herein are suitable for filing or at least partially filling the spaces while reducing or preventing crack formation therein and damage to set/cured lightweight slurries 10. Moreover, the lightweight slurries 10 and methods disclosed herein are suitable for cementing and/or treating the one or more zones of the well while maintain or substantially maintaining zonal isolation between the one or more zones of the well.

The lightweight slurries 10 disclosed herein are suitable and usable for cementing and/or treating the well or at least one fluid-containing zone of the well and/or may comprise or consist of water 12, the filler particles 14, the cement particles 16, the nano-particles 18, the optional additives, or at least one combination thereof. The lightweight slurry 10 disclosed herein may be mixed on site for use, or may be provided in one or more pre-mixed blends of the solid particles to which water 12 and/or other liquid component(s) may be added prior to pumping, introducing, and/or disposing the lightweight slurry 10 into the well. After the solid particles (i.e., the filler particles 14, the cement particles 16, the nano-particles 18, and/or the optional additives) are mixed together with a sufficient amount of water 12, the lightweight slurry 10 forms as a pumpable cement slurry that may be pumped, disposed, or introduced into the well and allowed to set or cure for a set time in at least fluid-containing one zone of the one or more zones of the well. The filler particles 14, the cement particles 16, the nano-particles 18, and/or the optional additives may be added to water 12 on location at a well-site of the well where it is to be used, or may carried out at other locations than the well-site of the well. If the well-site location is selected for carrying out said mixing/formulating of the lightweight slurry 10, the filler particles 14, the cement particles 16, the nano-particles 18, and/or the optional additives may be dispersed into water 12 and sufficiently mixed together to form the lightweight slurry 10 disclosed herein, and the formed lightweight slurry 10 may be emplaced, disposed, and/or circulated in the well or the at least one zone of the well using one or more pumping techniques known in the art. In an embodiment, the solid particles may be mixed with water 12 at more than about 3500 revolutions per minute (hereinafter "rpm"), about 4000 rpm, or less than about 4500 rpm for at least about 3 minutes, about 5 minutes, or less than about 7 minutes to form the lightweight slurry 10. Moreover, unexpectedly improved compressive strengths, as shown in the working examples disclosed herein, may be attained by the lightweight slurry 10 when particles sizes of the filler particles 14 and the cement particles 16 have been preselected for incorporation into the lightweight slurry 10.

Water

In one or more embodiments, water 12 utilized in the lightweight slurries 10 disclosed herein may be a low mineral water, such as, for example, tap water. In some embodiments, other water, such as, for example, brine or salt water may be optionally used or used in combination with the low mineral water. Further, the lightweight slurries 10 disclosed herein may have water contents of less than about 50% by weight, less than about 49% by weight, less than about 48% by weight, less than about 45% by weight, greater than about 44% by weight, greater than about 46% by weight, or greater than about 47% by weight, wherein all values are calculated to the total volumes of the lightweight slurries 10.

Filler Particles

In one or more embodiments, the filler particles 14 disclosed herein may be rigid inert filler particles, flexible inert filler particles, or at least one combination thereof and/or may have spherical shapes, non-spherical shapes, regular shapes, irregular shapes, or at least one combination thereof. In some embodiments, the rigid inert filler particles may be, may comprise, or may consist of rigid plastic—or polymer-based particles or beads, rigid particles or beads based on at least one hydrocarbon polymer or at least one aromatic hydrocarbon polymer, rigid cellular plastic particles or beads, lightweight thermoplastic particles or beads, expanded polystyrene particles or beads, lightweight, rigid, plastic foam insulation particles or beads, rigid polystyrene latex particles or beads, rigid polystyrene microspheres, or a combination thereof. Further, the flexible inert filler particles may be, may comprise, or may consist of flexible elastomeric particles or beads, rubber—or latex-based particles or beads, isoprene—or polyisoprene-based particles or beads, or at least one combination thereof. In some embodiments, the flexible elastomeric particles or beads may be particles or beads based on recycled rubber and/or may grinded or milled to specific or predetermined particle sizes by one or more known grinding or milling techniques or methods. In some other embodiments, the filler particles 14 disclosed herein may elastomeric particles or beads based on one or more selected from grounded rubber material, polystyrene or polystyrene copolymer, recycled plastics, grounded waste from agricultural products/processes, such as, for example, grounded nut shells, grounded corn cob, or at least one similar agricultural waste. In an embodiment, the rigid inert filler particles may be, may comprise, or consist of polystyrene particles or beads and the flexible inert filler particles may be, may comprise, or may consist of grounded rubber particles or beads.

The filler particles 14 may have average particle sizes or particles sizes of at least about 25 microns but no greater than 2 millimeters (hereinafter "mm"), at least about 35 microns but no greater than about 1.5 mm, at least about 50 microns but no greater than about 1 mm, or at least about 65 microns but no greater than 0.8 mm. Further, the filler particles 14 may have specific gravities of at least about 0.5 g/cc but no greater than about 2.0 g/cc, at least about 0.65 g/cc but no greater than about 1.75 g/cc, or at least about 0.8 g/cc but no greater than 1.5 g/cc. In some embodiments, the filler particles 14 may have particles size distributions of at least about 14 Mesh, at least about 20 Mesh, below about 30 Mesh, above about 30 Mesh, less than about 35 Mesh, less than about 40 Mesh, or less than about 45 Mesh and/or specific gravities of at least about 0.8 g/cc, at least about 1.0 g/cc, at least about 1.05 g/cc, about 1.06 g/cc, about 1.1 g/cc, no more than about 1.25 g/cc, no more than about 1.3 g/cc, or no more than 1.4 g/cc.

Cement Particles

In one or more embodiments, the cement particles 16 disclosed herein may comprise one or more silica materials that form, or are capable or suitable for forming, one or more calcium silicate hydrates upon exposure to water 12. In some embodiments, the one or more silica materials may be at least one selected from Portland cement, fly ash, blast furnace slag, or a combination thereof. Additionally, the one or more silica materials may have mean particles sizes of at least about 0.5 micron but no more than about 20 microns, at least about 1 micron but no more than about 10 microns, at least about 2 microns but no more than about 8 microns, at least about 2.5 microns but now more than about 7.5 microns, or at least one 3.5 microns but no more than 6.5 microns. Moreover, the one or more silica materials may be present in the lightweight slurries 10 at concentrations of not less than about 3% by weight, not less than about 4% by weight, not less than about 5% by weight, or not less than about 6% by weight, wherein all values are calculated to the total weight of the lightweight slurries 10.

In some embodiments, the cement particles 16 may further comprise one or more cementitious materials, such as, for example, limestone, clay, bottom ash, cement kiln dust, other cement-like materials, chemical additives, or at least one combination thereof. Further, the cement particles 16 may be present in the lightweight slurries 10 disclosed herein at concentrations of no less than about 12% by weight calculated to the total weight of the lightweight slurries 10. In some embodiments, the cement particles 16 may be micro-sized cement particles having Sg values of about 3.16 with particles sizes having d50 values of about 6 microns, Class G cement particles having Sg values of about 3.2 with particles sizes having d50 values about 27 microns.

Nano-Particles

The nano-particles 18 may comprise nano-sized calcium carbonate particles have average particle sizes or particles sizes of at least about 5 nanometers (hereinafter "nm") but no more than about 150 nm, at least about 7.5 nm but no more than about 125 nm, at least about 10 nm but no more than about 100 nm, or at least about 12 nm but no more than about 90 nm. Further, the nano-particles 18 may be present in the lightweight slurries 10 at concentrations of at least about 0.05% by weight but no more than about 2.5% by weight, at least about 0.75% by weight but no more than about 2.25% by weight, at least about 0.1% by weight but no more than 2% by weight, at least about 0.125% by weight but no more than about 1.75% by weight, wherein all values are calculated to the weight of the lightweight slurries 10. In an embodiment, the nano-particles 18 are present in the lightweight slurries 10 at concentrations of at least about 0.25% by weight but no more than about 0.5% by weight, about 0.3% by weight, or about 0.4 by weight, wherein all values are calculated to the total weight of the lightweight slurries 10.

In some embodiments, the lightweight slurry 10 disclosed herein may be or may comprise at least one controlled particle size cement formulation comprising one or more fine particles, one or more medium particles having first sizes, one or more large particles having second sizes, or a combination thereof. In an embodiment, the one or more fine particles may be or may comprise the nano-particles 18, the one or more medium particles may be or may comprise the cement particles 16, the one or more large particles may comprise the filler particles 14, and the first sizes may be less than or equal to the second sizes.

Optional Additives

In one or more embodiments, the optional additives of the lightweight slurries 10 disclosed herein may be or may comprise one or more dry cement additives and/or one or more liquid cement additives that are usable or suitable to control density, setting time, strength and flow properties and/or to reduce occurrence of annular gas flow. In some embodiments, the optional additives disclosed herein may comprise one or more suspension agents, one or more dispersing agents, one or more antifoam agents, one or more surfactants, one or more retarders, one or more expansion agents, one or more weighting agents, one or more cement setting accelerators, one or more fluid loss control agents, or at least one combination thereof.

Cementing/Treating Methods

In one or more embodiments, the methods disclosed herein may comprise mixing the solid particles (i.e., the filler particles 14, cement particles 16, nano-particles 18, and/or optional additives) and water 12 together to form the lightweight slurries 10 disclosed herein, wherein the formed lightweight slurries 10 are pumpable cement slurries. The methods disclosed herein may comprise pumping the lightweight slurries 10 into the well and/or allowing the lightweight slurries 10 to set for a set time and/or cure for a cure time within the well for cementing and/or treating the well. In some embodiments, the methods disclosed herein may comprise drilling the well prior to cementing and/or treating the well with the lightweight slurries 10. For example, the lightweight slurries 10 may be pumped, disposed, or introduced into the well following one or more wellbore and/or drilling operations. Further, the methods disclosed herein may comprise dry blending the filler particles 14, cement particles 16, nano-particles 18, and/or the optional additives prior to mixing with the water to form the lightweight slurries 10. For example, solid particles used in or suitable for the cement compositions, such as, for example, the filler particles 14, cement particles 16, nano-particles 18, and/or the optional additives, may be provided in one or more pre-mixed blends to which water 12 and/or other liquid components may be added prior to pumping or introducing the lightweight slurries 10 into the well. After the lightweight slurries have been pumped into the well and the set and/or cure time has passed, lapsed, expired, or been completed, the resulting hardened or cured cement compositions formed from the lightweight slurries 10 may provide physical stability and/or isolation of the one or more zones through which the well may pass.

In some embodiments, the methods disclosed cement and/or treat the well or at least one zone of the well with the lightweight slurry 10 disclosed herein. For example, the methods disclosed herein may comprising filling or at least partially filling the space between the outside of the metal casing and the borehole wall of the well with the lightweight slurry 10 disclosed herein to provide physical stability and isolation of the one or more zones through which the well may pass. As a result, the spaces may be filled, or at least partially filled, by the lightweight slurries 10 disclosed herein, and at least one zone of the well may be cemented and/or treated by the lightweight slurries 10 disclosed herein.

Working Examples

Ex. 1: lightweight slurry containing polystyrene beads: 11.2 ppg slurry design.

245 grams (hereinafter "g") of light weight polystyrene beads with specific gravity of 1.06 g/cc and with a particle size distribution of about 14/40 Mesh were dry blended with 270 g of a micro cement (Sg: 3.16) with particle size having a d50 of about 6 microns. To this mixture was added 5.4 g of nano-sized calcium carbonate. The dry blend was added to 275 g of water under mixing at 4000 rpm for 5 minutes. The slurry was then conditioned for 1 hour at 150° F. and placed into cube molds. The cubes were immersed in water at 110° F. to allow for setting/curing. After 24 hours, the cubes were recovered and crushed to measure their compressive strength.

In Ex. 1, a lightweight cement containing 39% by volume of slurry of filler, 47% by volume of the slurry of water, 14% by volume of the slurry of cement, and 0.4% by volume of the slurry of nano-sized calcium carbonate was able to provide a compressive strength of 1000 psi after the 24-hour setting/curing period at 110° F.

Ex. 2: lightweight slurry containing elastomeric particles: 11.2 ppg slurry design.

259 g of grounded rubber with specific gravity of 1.1 g/cc and with a particle size distribution below 30 Mesh were dry blended with 258 g of a micro cement (Sg: 3.16) with particle size having a d50 of about 6 microns. To this mixture was added 5.2 g of nano-sized calcium carbonate. The dry blend was added to 275 g of water under mixing at 4000 rpm for 5 minutes. The slurry was then conditioned for 1 hour at 150° F. and placed into cube molds. The cubes were immersed in water at 110° F. to allow for setting/curing. After 24 hours, the cubes were recovered and crushed to measure their compressive strength.

In Ex. 2, a flexible lightweight cement containing 40% by volume of the slurry of elastomer, 47% by volume of the slurry of water, 13% by volume of the slurry of cement, and 0.3% by volume of the slurry of nano-sized calcium carbonate was able to provide a compressive strength of 410 psi after the 24-hour setting/curing period at 110° F.

Ex. 3: lightweight slurry containing elastomeric particles with a cementitious admixture; 11.2 ppg slurry design.

254 g of grounded rubber with specific gravity of 1.1 g/cc and with a particle size distribution below 30 Mesh were dry blended with 131 g of a micro cement (Sg: 3.16; d50: 6 microns), 131 g of a fine slag cement (sg: 2.9; d50: 5 microns). To this mixture was added 5.75 g of nano-sized calcium carbonate. The dry blend was added to 274 g of water under mixing at 4000 rpm for 5 minutes. The slurry was then conditioned for 1 hour at 150° F. and placed into cube molds. The cubes were immersed in water at 110° F. to allow for setting/curing. After 24 hours, the cubes were recovered and crushed to measure their compressive strength.

In Ex. 3, a flexible lightweight cement containing 38% by volume of the slurry of elastomer, 47% by volume of the slurry of water, 7% by volume of the slurry of microcement, 7% of fine slag cement, and 0.4% by volume of the slurry of nano-sized calcium carbonate was able to provide a compressive strength of 625 psi after the 24-hour setting/curing period at 110° F.

However, not every system containing cement may be successful and/or the particle size of cement may, in some embodiments, be at least one critical parameter to achieving superior and/or unexpected results similar to the results for Ex. 1, Ex. 2, and Ex. 3. For example, Ex. 4 shows a system that did not achieve a superior and/or unexpected performance when compared to Ex. 1, Ex. 2, and Ex. 3 disclosed herein.

Ex. 4: lightweight containing elastomeric particle with cement class G of d50 of about 27 microns.

260 g of grounded rubber with specific gravity of 1.1 g/cc and with a particle size distribution below 30 Mesh were dry blended with 260 g of Class G cement (Sg: 3.2) with particle size having a d50 of about 27 microns. The dry blend was added to 275 g of water under mixing at 4000 rpm for 5 minutes. The slurry was then conditioned for 1 hour at 150° F. and placed into cube molds. The cubes were immersed in water at 110° F. to allow for setting/curing. After 24 hours, the cubes were recovered and crushed to measure their compressive strength.

In Ex. 4, a flexible lightweight cement containing 40% by volume of the slurry of elastomer, 47% by volume of the slurry of water, and 13% by volume of the slurry of cement was unable to set after the 24-hour setting/curing period, hence, no compressive strength was measured or measurable.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A pumpable composite cement slurry comprising:
    cementitious material at a concentration between about 12% by weight and about 34% by weight, calculated to a total weight of the slurry, wherein the cementitious material comprises one or more silica materials that form calcium silicate hydrates upon exposure to water, the one or more silica materials present at a concentration of at least about 12% by weight, calculated to the total weight of the slurry;
    inert filler material at a concentration of at least about 30% by weight, calculated to the total weight of the slurry;
    nano-sized calcium carbonate particles having a mean particle size of between about 5 nanometers (nm) and about 90 nm, wherein the nano-sized calcium carbonate particles are present at a concentration of between about 0.05% by weight and about 2.5% by weight, calculated to the total weight of the slurry; and
    water present at a concentration between about 44% by volume and about 50% by volume, calculated to a total volume of the slurry,
    wherein:
        the one or more silica materials of the cementitious material have a mean particle size of between about 1 micron and about 20 microns,
        the inert filler material has particle sizes of between about 50 microns and about 2 millimeters (mm),
        the slurry has a density of between about 9.5 pounds per gallon (ppg) and about 12.5 ppg,
        the slurry is curable at a temperature of at least about 100° F. to form a composite cement that has a compressive strength of greater than about 400 pounds per square inch, and
        a solid volume fraction of the slurry is greater than about 50%.

2. The slurry of claim 1, wherein the density of the slurry is between about 10.5 ppg and about 12 ppg.

3. The slurry of claim 1, wherein the mean particle size of the one or more silica materials is between about 1 micron and about 10 microns.

4. The slurry of claim 3, wherein the cementitious material comprises at least one of Portland cement, blast furnace slag, fly ash, or any combination thereof.

5. The slurry of claim 1, wherein the one or more silica materials are present at a concentration not less than 5% by weight, calculated to the total weight of the slurry.

6. The slurry of claim 1, wherein the particle sizes of the inert filler material are between about 50 microns and about 1 mm.

7. The slurry of claim 6, wherein the inert filler material has a specific gravity between about 0.8 g/cc to about 1.5 g/cc.

8. The slurry of claim 6, wherein the inert filler material comprises at least one of one or more rigid inert filler particles, one or more flexible inert filler particles, or any combination thereof.

9. The slurry of claim 8, wherein the one or more rigid inert filler particles comprise plastic-based or polymer-based particles or beads and the one or more flexible inert filler particles comprise flexible elastomeric particles.

10. The slurry of claim 7, wherein the inert filler material comprises a material selected from the group consisting of:
    at least one elastomeric-based material;
    a material based on ground rubber;
    polystyrene or polystyrene copolymer;
    a recycled plastic material;
    ground nut shells;
    ground corn cob; and
    any combination thereof.

11. The slurry of claim 7, wherein the inert filler material comprises a material selected from the group consisting of a material based on ground rubber, polystyrene or polystyrene copolymer, and any combination thereof.

12. The slurry of claim 1, wherein the mean particle size of the nano-sized calcium carbonate particles is between about 10 nm and about 90 nm.

13. The slurry of claim 12, wherein the nano-sized calcium carbonate particles are present in the slurry at a concentration of between about 0.1% by weight and about 2% by weight, calculated to the total weight of the slurry.

14. The slurry of claim 1, wherein the inert filler material comprises a material selected from the group consisting of ground rubber material, a recycled plastic material, ground nut shells, ground corn cob, and any combination thereof.

15. The slurry of claim 1, wherein the inert filler material comprises ground rubber material.

16. A method of cementing a subterranean well, the method comprising:
pumping the slurry of claim 1 into at least one zone of the well.

17. The method of claim 16, further comprising:
setting or curing the slurry at a temperature of at least about 100° F. to form a lightweight composite cement that has a compressive strength of greater than about 400 pounds per square inch.

18. A method of producing composite cement compositions, the method comprising:
mixing solid particles with water to form a pumpable cement slurry, wherein the water is present at a concentration between about 44% by volume and about 50% by volume, calculated to a total volume of the slurry; and
setting or curing the slurry at a temperature of at least about 100° F. to produce a lightweight composite cement,
wherein:
the pumpable cement slurry has a density of at least about 10 pounds per gallon (ppg) and no more than about 12 ppg,
the lightweight composite cement has a compressive strength of greater than 400 pounds per square inch,
the solid particles comprise:
cement particles that form calcium silicate hydrates upon exposure to water, wherein the cement particles are present at a concentration between about 12% by weight and about 34% by weight, calculated to a total weight of the slurry, and wherein the cement particles comprise one or more silica materials having a mean particle size of between about 1 micron and about 20 microns, the one or more silica materials present at a concentration of at least about 12% by weight, calculated to the total weight of the slurry;
inert filler particles having particle sizes of between about 50 microns and about 1 millimeter, wherein the inert filler particles are present at a concentration of at least about 30% by weight, calculated to the total weight of the slurry; and
nano-sized calcium carbonate particles at a concentration of between about 0.05% by weight and about 2.5% by weight, calculated to the total weight of the slurry, and
a solid volume fraction of the slurry is at least about 50%.

* * * * *